Figure 1:
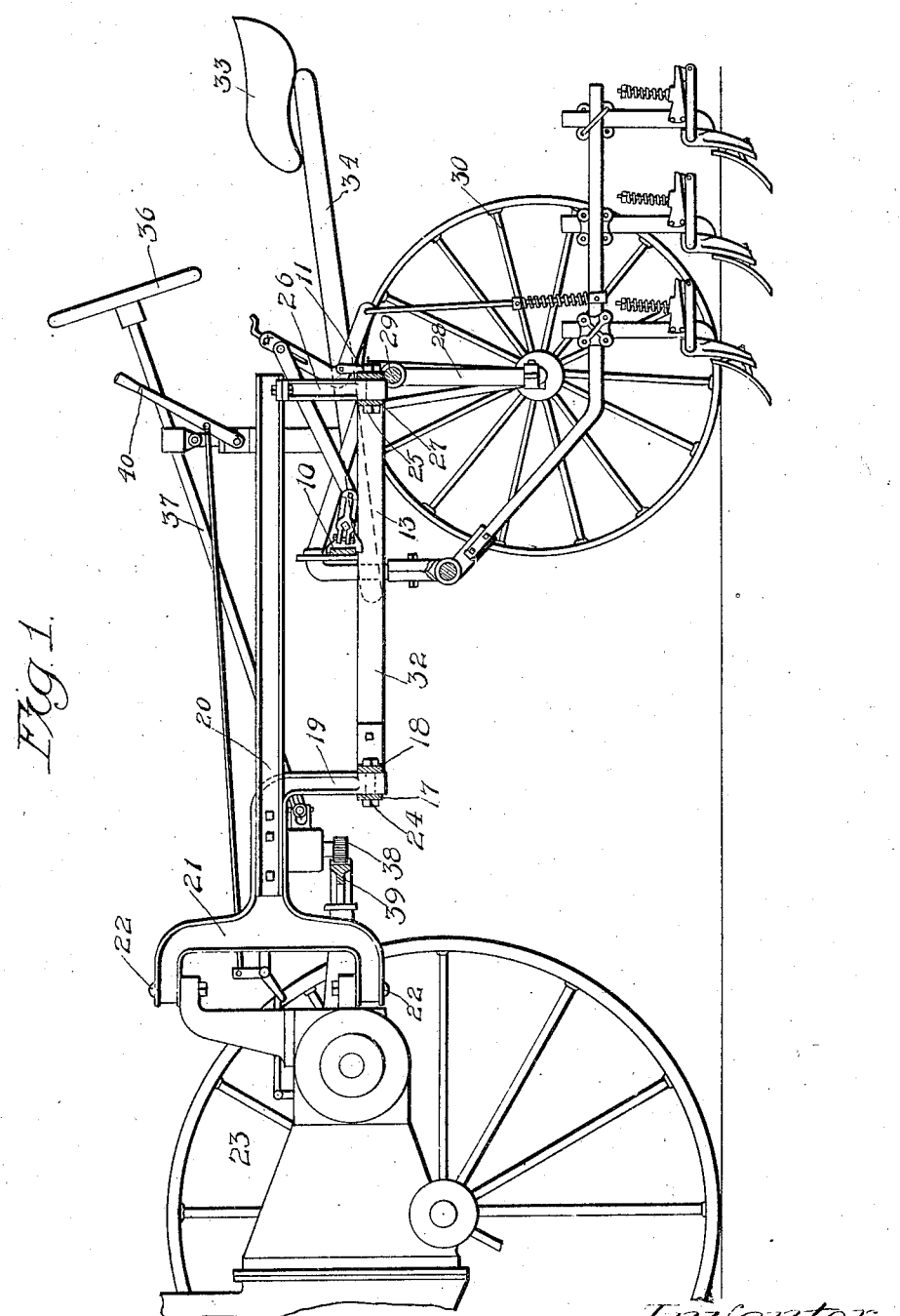

Nov. 27, 1923.

H. S. DICKINSON

TRACTOR CULTIVATOR

Filed Jan. 5, 1918

1,475,226

2 Sheets-Sheet 1

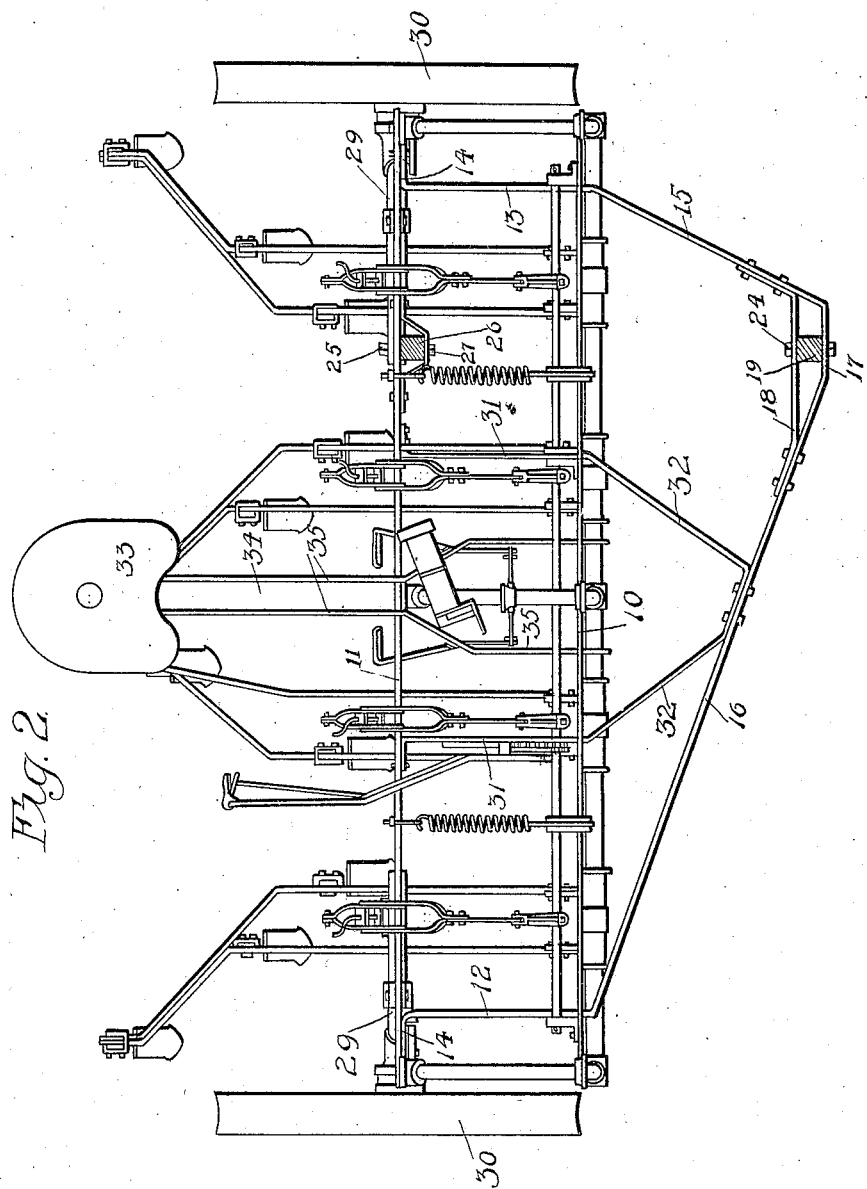

Patented Nov. 27, 1923.

1,475,226

UNITED STATES PATENT OFFICE.

HARRY S. DICKINSON, OF MOLINE, ILLINOIS, ASSIGNOR, BY MESNE ASSIGNMENTS, TO MOLINE PLOW COMPANY, INCORPORATED, OF MOLINE, ILLINOIS, A CORPORATION OF VIRGINIA.

TRACTOR CULTIVATOR.

Application filed January 5, 1918. Serial No. 210,461.

*To all whom it may concern:*

Be it known that I, HARRY S. DICKINSON, a citizen of the United States, residing at Moline, county of Rock Island, and State of Illinois, have invented certain new and useful Improvements in Tractor Cultivators, of which the following is a specification.

The present application is a division of application, Serial No. 180,558, filed July 14, 1917, issued December 3, 1918, Patent No. 1,286,557. The invention herein described and claimed relates primarily to the connections provided between the tractor and the cultivator frame for utilizing the rear support afforded by the cultivator in maintaining the equilibrium of the tractor element.

The cultivator of the present invention is designed primarily for use in association with a two-wheeled tractor of the unstable type, which relies for rear support upon the trailing implement with which it is associated. In an association of this kind, it is necessary to provide connections between the tractor and the trailing implement of such a nature as to resist vertical thrust, and at the same time afford flexibility in a horizontal direction in order to provide for the steering of the combined implement. Where a tractor is used as the motive power, it is necessary that the tractor be light enough to prevent undue packing of the soil, and at the same time be able to transport itself over newly plowed fields. In use the cultivator is required to cultivate the ground between rows which are ordinarily spaced rather close together, usually three feet four inches apart to three feet ten inches apart. The wheel tread of the tractor must be such as to successfully operate within the limits set by the width of the rows, and the cultivation must be continued until the crops have attained such a degree of maturity that cultivation may be discontinued. This last circumstance requires provision of considerable clearance between the tractor and cultivator; and these requirements must be met in a combined implement in which the cultivator itself is relied upon as a factor in the supporting, steering and guiding of the structure as a whole. This requires that the cultivator frame be so constructed as to afford the necessary rigidity for supporting the cultivating tools suspended therefrom, which should be dragged through the ground without the provision of low down draft connections which might interfere with the growing crops.

The frame is thus required to meet and resist certain torsional strains which must be suitably provided for and overcome by so constructing the frame and connections as to afford the necessary rigidity in certain directions combined with the flexibility in other directions which is needed to readily adapt the implement to the conditions encountered.

In the drawings:

Figure 1 is a side elevation showing the combined implement comprising the unstable tractor unit and the trailing cultivator; and Fig. 2 is a top or plan view of the cultivator.

The cultivator of the present invention, in its general arrangement, resembles an ordinary two-row cultivator. The working parts are carried by the frame comprising a front rail 10, a rear rail 11, and end rails 12 and 13. This gives to the frame a transversely elongated rectangular shape and provides the necessary supports for the operating elements. The end rails 12 and 13, at their rear ends, terminate in angular extensions 14 which are bolted or otherwise rigidly connected to the rear rail 11. The end rails in front are continued to afford a front extension comprising converging rails 15 and 16, the former of which is considerably shorter than the latter, with the result that the apex 17 of the front extension will occupy a position considerably to the left of the center of the cultivator as viewed from the rear towards the front.

Inside of the apex of the extension is located a cross bar 18 which gives to the structure the form of a double bridge and affords a space for the reception of a front hanger 19 which depends from and is rigidly secured to a rearwardly extending tractor beam 20 which is carried by and rearwardly extends from a yoke 21 pivoted by aligned vertical pivots 22 to the frame of a tractor 23, preferably of the two-wheeled unstable type, which relies upon the cultivator to afford the necessary rear support for the combined implement.

The tractor beam is mounted to afford freedom of movement in a horizontal direction which is necessary in steering the combined implement, but the pivotal connections for the beam are resistant against vertical thrust, so that, with the cultivator attached, the combined implement will have characteristics of a unitary structure which may be steered and controlled from the driver's seat at the rear of the cultivator. The specific details of the tractor or power unit, other than those described, form no part of the present invention, and further description thereof is deemed unnecessary.

The front hanger 19 is pivoted within the space between the members 17 and 18 by means of a longitudinally extending forward pivot 24 which co-operates with an aligned rear pivot 25 passing through the end of a rear hanger 26 depending from the tractor beam, which arrangement affords a connection between the tractor beam and the cultivator of a nature to resist heavy vertical thrust, and at the same time permit a tilting or rocking of the cultivator upon the aligned pivots which is necessary in order to afford suitable flexibility to meet ground conditions without impairing the steering and controlling of the combined implement as a whole.

The pivot 25 is entered through the rear rail 11 of the frame and through a forwardly extending bracket 27 which affords a space for the reception of the lower end of the hanger 26 through which the pivot is entered.

The rectangular frame affords a mounting for a pair of angularly disposed wheel supports 28, each of which, at its upper end, terminates in an inward extension 29 which is rigidly connected with the rear rail 11 of the frame structure, and at its lower end terminates in the usual outwardly projecting axle (not shown) upon which the associated ground wheel 30 is journaled. These details are common to cultivators of this general type, and need not be further described.

The frame and forward extension are further reinforced by the provision of centrally disposed brace bars 31 which unite the front and rear rails of the frame, and are continued in the form of convergent brace extensions 32 which are secured to the rail 16 at a point in the longitudinal center of the implement.

The seat 33 is carried upon a seat beam 34 which comprises companion bars 35 resting upon the upper edge of the rear rail 11, and are spread at their forward ends 35 and carried under the forward rail 10 of the frame, which arrangement affords a strong, rigid and well anchored support for the seat and the weight of the driver carried thereby.

The combined implement is steered through the medium of a steering wheel 36 carried by a shaft 37 which serves through gear connections (not shown) to impart rotation to a spur pinion 38 which meshes with a gear segment 39 on the tractor element. The combined implement is controlled through the medium of suitable controlling levers and connections 40 which are likewise arranged in convenient relation to the driver's seat.

The structure above described is one which affords a firm connection between the tractor beam and the cultivator frame which will be resistant against vertical thrust, and at the same time will afford the necessary tilting or rocking of the two units with respect to one another.

By providing the reinforced forward extension on the cultivator frame, the longitudinal pivotal connections are sufficiently separated in a fore and aft direction to afford the necessary resistance to vertical thrust to meet the strains encountered without providing depending braces or draft connections below the frame which tend to interfere with the cultivating operations. At the same time the frame structure is one which permits of a direct attachment being made with the hangers 19 and 26 without the intervention of intermediate connecting elements.

By locating the points of connection to the left of the longitudinal center of the implement, the driver is enabled to obtain an unobstructed view ahead, and at the same time the location is one which brings the trailing implement into proper alignment with the tractor wheels, and enables the latter to run between the rows of growing plants, and also properly aligns the cultivating implements which are secured to the cultivator frame. The side draft occasioned by this arrangement, however, is adequately provided for by the structure of the cultivator frame, which is suitably braced and reinforced to properly withstand the side draft.

I claim:

1. The combination with a two wheel tractor of the unstable type constituting an independent power unit attachable to various devices to be drawn and having a rearwardly extending coupling frame pivoted to swing about a substantially vertical axis in a plane relatively high above the ground so as to clear crops being cultivated, of a cultivator having ground wheels and a frame including front and rear cross members and connections between the tractor coupling frame and the front and rear cross members of the cultivator permitting the cultivator to move relative to the coupling frame about a substantially longitudinal, horizontal axis, said connections serving to absorb the reaction of the tractor, to stabilize it, and to transmit draft to the cultivator, the connections being located relatively high above the ground so as to clear objects such as growing crops.

2. The combination with a two wheel tractor of the unstable type comprising an independent power unit attachable to various devices to be drawn and having a rearwardly extending coupling frame pivoted to it to swing about a substantially vertical axis in a plane relatively high above the ground so as to clear crops being cultivated, of a two-row corn cultivator having a wheeled frame to which the tractor coupling frame is connected at one side of the center line of the cultivator, an operator's seat near the center line of the cultivator, controlling and steering mechanisms for the tractor extending rearwardly to a point adjacent the operator's seat, and connections between the cultivator and the coupling frame for permitting the cultivator to tilt relative to the tractor about a substantially longitudinal, horizontal axis, the coupling frame, the cultivator and the connections between the two serving to stabilize the tractor, to absorb the reaction, and to transmit draft from the tractor to the cultivator.

3. The combination with a front wheel drive tractor having a rearwardly extending coupling unit pivoted to the tractor to swing about a substantially vertical axis, of a wheeled frame provided with widely separated front and rear rails and a forward extension comprising a pair of rails convergent to a point on one side of the longitudinal center of the frame, and means for connecting the tractor coupling unit to the frame at the de-centered apex thereof and also to the rear rail thereof.

4. The combination with a front wheel drive tractor having a rearwardly extending coupling unit pivoted to it to swing about a substantially vertical axis, of a wheeled frame provided with widely separated front and rear rails and with a forward extension comprising a pair of rails convergent to a point on one side of the longitudinal center of the frame, and front and rear hangers depending from the tractor coupling unit, the forward hanger being pivoted to the frame extension at the de-centered apex thereof and the rear hanger being pivoted to the rear rail of the frame.

5. The combination with a front wheel drive tractor having a rearwardly extending coupling unit pivoted to it to swing about a substantially vertical axis, of a wheeled frame provided with widely separated front and rear members and with a forward extension comprising a pair of members convergent to a point on one side of the longitudinal center of the frame, means for connecting the coupling unit to the de-centered apex of the frame extension and to the rear member of the frame, a seat beam extending rearwardly from the wheeled frame and having a seat mounted thereon, and steering and controlling devices for the tractor supported in convenient relation to the seat.

HARRY S. DICKINSON.